United States Patent
Okawara

(10) Patent No.: US 7,954,102 B2
(45) Date of Patent: May 31, 2011

(54) SCHEDULING METHOD IN MULTITHREADING PROCESSOR, AND MULTITHREADING PROCESSOR

(75) Inventor: Hideki Okawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1300 days.

(21) Appl. No.: 11/122,047

(22) Filed: May 5, 2005

(65) Prior Publication Data

US 2005/0210471 A1    Sep. 22, 2005

Related U.S. Application Data

(63) Continuation of application No. PCT/JP02/11818, filed on Nov. 13, 2002.

(51) Int. Cl.
G06F 9/46 (2006.01)
(52) U.S. Cl. ...................................... 718/102
(58) Field of Classification Search ............... 718/102, 718/104, 108
See application file for complete search history.

(56) References Cited

U.S. PATENT DOCUMENTS

| | | | | |
|---|---|---|---|---|
| 6,216,220 | B1 * | 4/2001 | Hwang | 712/219 |
| 6,549,930 | B1 * | 4/2003 | Chrysos et al. | 718/104 |
| 6,658,447 | B2 * | 12/2003 | Cota-Robles | 718/103 |
| 7,139,898 | B1 * | 11/2006 | Nemirovsky et al. | 712/206 |
| 7,518,993 | B1 * | 4/2009 | Dennis | 370/235 |
| 2002/0188807 | A1 * | 12/2002 | Chaudhry et al. | 711/128 |

FOREIGN PATENT DOCUMENTS

| | | |
|---|---|---|
| JP | 4-71034 | 3/1992 |
| JP | 7-302246 | 11/1995 |
| JP | 2003-167748 | 6/2003 |

OTHER PUBLICATIONS

Okawara et al. "Dynamical Control of Multithreading Level on a SMT Processor" vol. 2002, No. 112. pp. 17-22.
Matsuzaki et al. "A technique of hiding memory access latency for Multi-threading Processor." vol. 2001, No. 22. pp. 67-72.
Masami Yamatani., "Kaso Kioku System Nyumon", first edition, Ohmsha, Ltd., 1978, pp. 84-87.
Yutaka Sugawara, et al., "Latency Yosoku ni Motozuita Meirei Fetch Kiko", The Institute of Electronics, Information and Communication Engineers Gijutsu Kenkyu Hokoku, Apr. 21, 2000, vol. 100, No. 2, p. 9; left column; line 1 to p. 10; left column; line 35.
Shoji Kawahara, et al., "An α-Coral processor based on Single chip multithreaded architecture", Heiretsu Shori Symposium JSPP2001, 2001, No. 6, pp. 39-46.

(Continued)

*Primary Examiner* — Meng-Ai An
*Assistant Examiner* — Blake Kumabe
(74) *Attorney, Agent, or Firm* — Stass & Halsey LLP

(57) ABSTRACT

In regard to a scheduling method in a multithreading processor, a thread to be executed is dynamically selected from the threads allotted to the context units according to an operation state of the multithreading processor, and the number of threads to be executed simultaneously or the combination thereof is changed. Also, at the time of context switching, threads to be allotted to the context units are dynamically selected according to an operation state of the multithreading processor. As an example of a method for deciding the operation state, the decision is made by whether a set reference value is exceeded by the number of fetch stall times in a predetermined period on a thread-by-thread basis, number of missing cache times, memory access latency, IPC counter, or the like.

8 Claims, 10 Drawing Sheets

OTHER PUBLICATIONS

D. M. Tullsen et al., Exploiting Choice: Instruction Fetch and Issue on an Implementable Simultaneous Multithreading Processor, Proceedings of the 23$^{rd}$ Annual International Symposium on Computer Architecture, May 1996, vol. 1, pp. 191-202.

Shoji Kawahara, et al., "Koseino Processor Model ni okeru Architecture to OS no Kyocho", Information Processing Society of Japan Dai 64 Kai (Heisei 14 nen) Zenkoku Taikai, p. 1-247, right column, line 35 to p. 1-248, left column, line 25.

* cited by examiner

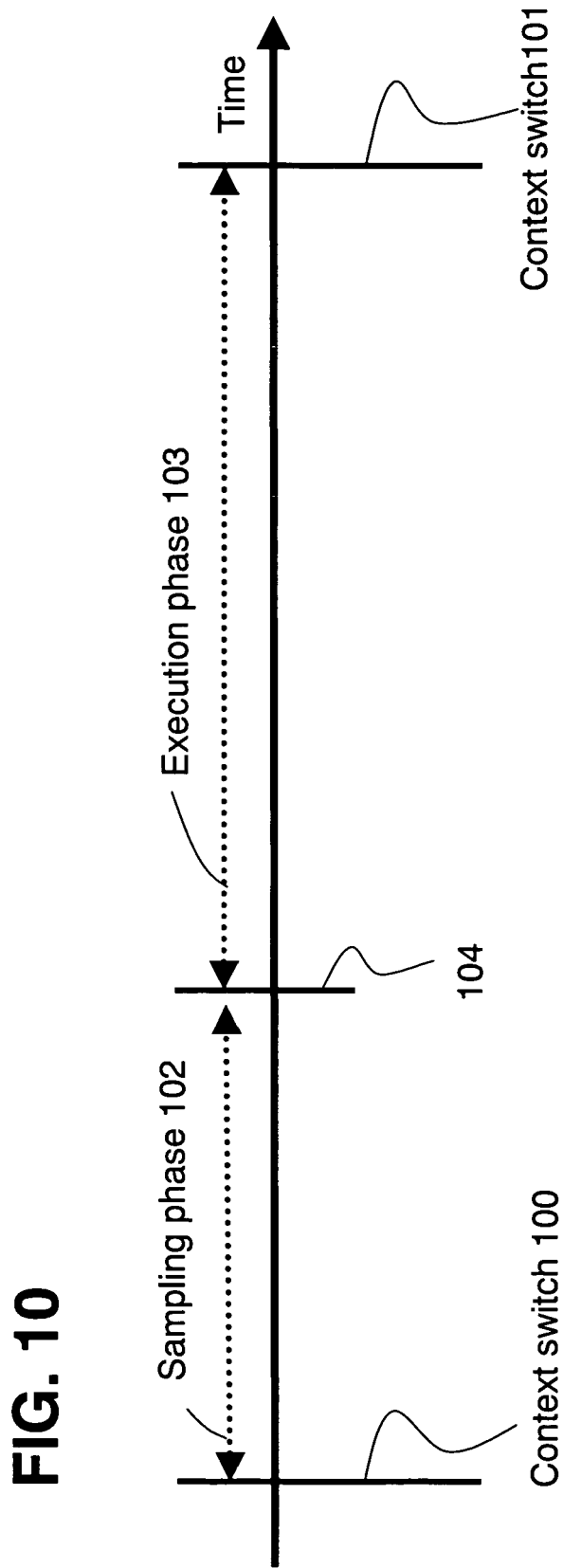

ic application is a continuing application, filed under 35 U.S.C. §111(a), of International Application PCT/JP02/11818, filed Nov. 13, 2002, incorporated by reference herein.

SCHEDULING METHOD IN MULTITHREADING PROCESSOR, AND MULTITHREADING PROCESSOR

This application is a continuing application, filed under 35 U.S.C. §111(a), of International Application PCT/JP02/11818, filed Nov. 13, 2002, incorporated by reference herein.

TECHNICAL FIELD OF THE INVENTION

The present invention relates to a scheduling method in a multithreading processor, and a multithreading processor, and more particularly a scheduling method in a multithreading processor and a multithreading processor, in which a thread to be executed is dynamically selected according to an operation state of the multithreading processor.

BACKGROUND ART

A state in which a program, which shows an instruction sequence written with a text editor, etc., is executed by a processor is termed 'process'. Processing performed by the process is divided into a plurality of portions, each termed 'thread'. Each thread has information such as register and program counter for use in the thread concerned, and the information is termed 'context'.

In recent years, an SMT (simultaneous multithreading) processor attracts attention, in which a plurality of threads (or processes) are simultaneously executable in one processor. In the multithreading processor, a plurality of context units are installed to preserve the contexts on a thread-by-thread basis. The multithreading processor allots a thread for each context unit, and executes a plurality of threads simultaneously.

The multithreading processor reads in (which is termed 'fetch') each instruction from an address specified by the program counter corresponding to each thread, and simultaneously executes the plurality of threads. Because the number of threads simultaneously executable is limited by the number of installed context units, the multithreading processor selects a thread to be executed next from among the threads in a standby state, which are not allotted to the context units at present, and switches an executable thread (which is termed context switching). In this specification of the invention, to select a thread for execution and to switch the thread by the context switching are termed 'scheduling'.

However, according to the conventional scheduling, the multithreading processor uses the entire context units being installed, and simultaneously fetches the instructions of the entire executable threads selected at the time of context switching. Further, the thread selected at the time of the context switching does not reflect the operation state of the multithreading processor.

Accordingly, depending on the combination of the selected threads, processing is concentrated into a particular unit in the multithreading processor. This produces delay caused by resource competition which impedes efficient thread execution. As a result, it has been not possible to improve the processing efficiency, even when the threads are executed by fully using the installed context units.

For example, when a data accessed for an instruction fetch or accessed by a memory access instruction is not existent in a cache having a high-speed transfer rate, and thus an unsuccessful access to the cache (which is hereafter referred to as 'missing cache') occurs, an access to a main memory having a low-speed transfer rate is forced, which produces a delay. Such a case also happens in the multithreading processor. Namely, when the instructions of a plurality of threads are simultaneously fetched and executed, the processing efficiency of the multithreading processor may not be improved because of occurrence of cache competition and an increased number of missing cache times.

As one method for improving the processing efficiency in the multithreading processor, a document has been disclosed (as U.S. Pat. No. 6,247,121, "Multithreading processor with thread predictor" by Quinn A. Jacobson, issued on Jun. 12, 2001). According to this patent, in a multithreading processor, a speculative thread is generated based on a branch prediction before the execution of a branch instruction, and executed in the multithreading processor. However, in the above disclosure, the scheduling in case of a plurality of identical or different processes being existent has not been proposed.

DISCLOSURE OF THE INVENTION

It is an object of the present invention to provide a scheduling method in which threads to be executed are selected so that delay caused by resource competition may not be produced, and to provide a multithreading processor.

According to a first invention of the present invention, the above object is achieved by providing a scheduling method in a multithreading processor including: allotting a plurality of executable threads; dynamically deciding the number of threads to be executed according to an operation state of the multithreading processor; selecting the decided number of threads from the plurality of allotted threads; and fetching and executing instructions of the selected threads in an identical period.

Further, according to a second invention of the present invention, the above object is achieved by providing a scheduling method in a multithreading processor including: dynamically deciding the number of threads to be context-switched, according to an operation state of the multithreading processor; allotting the decided number of threads from a plurality of executable threads; and fetching and executing instructions of the allotted threads in an identical period.

Still further, according to an eighth invention of the present invention, in the first and the second invention, the above object is achieved by providing a scheduling method of the multithreading processor including: a first time period in which at least one thread is selected based on a predetermined condition, instructions of the selected thread are fetched and executed, a degree of resource competition at the time of the execution is recorded, and the recording of the degree of resource competition is repeated for a predetermined number of times, with the predetermined condition being changed; and a second time period in which a thread is selected based on a condition that the degree of resource competition recorded in the first time period becomes the minimum, and instructions of the selected thread are fetched and executed.

Further, according to a ninth invention of the present invention, the above object is achieved by providing a scheduling method in a multithreading processor in which a plurality of executable threads are allotted, and instructions of the plurality of threads are fetched and executed in an identical period. The scheduling method includes: selecting with priority a plurality of threads from an identical process; and fetching and executing instructions of the selected threads.

Further, according to a tenth invention of the present invention, the above object is achieved by providing a multithreading processor including: a plurality of context units each corresponding to a single thread; a resource competition measurement unit measuring a degree of resource competition when a thread is executed; a fetch unit selecting at least one thread from among the threads corresponding to the context units according to the measured degree of resource competition, and fetching the instructions of the selected thread; a decode unit decoding the fetched instructions; and an instruction execution unit executing the decoded instructions.

According to one embodiment of the present invention, based on the number of fetch stall times of each thread, the number of threads to be executed simultaneously, or the combination thereof, is dynamically selected, and the selected threads are executed accordingly. Further, according to another embodiment, threads are selected with priority from an identical process, and the selected threads are executed accordingly. Further, according to still another embodiment, there are provided a first time period in which a degree of resource competition of a multithreading processor is measured while changing predetermined conditions, and a second time period in which a thread is selected based on a condition such that the degree of resource competition measured in the first phase becomes the minimum, and the selected thread is executed accordingly.

In such a way, according to the operation state of the multithreading processor, threads to be executed are dynamically selected from the entire threads allotted to the context units, and the number of threads to be executed simultaneously, or the combination thereof, is dynamically changed. Thus, it becomes possible to avoid delay produced by resource competition, and improve processing efficiency of the multithreading processor.

BRIEF DESCRIPTION OF THE DRAWINGS

FIG. 10 shows an explanation diagram illustrating a fourth embodiment.

PREFERRED EMBODIMENTS OF THE INVENTION

Figure 1:
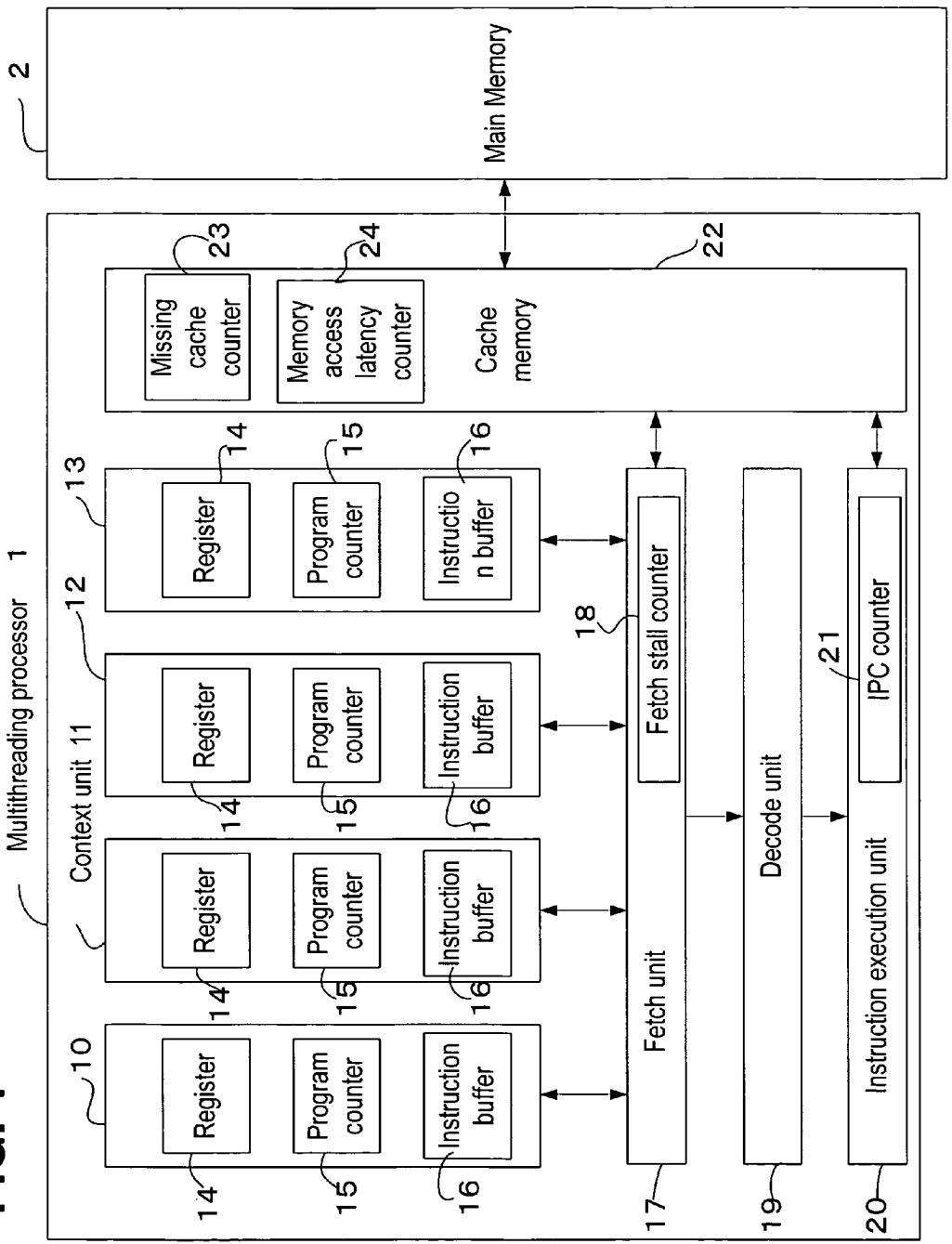
FIG. 1 shows an exemplary configuration of a multithreading processor according to an embodiment of the present invention.

The embodiments of the present invention will be described hereafter referring to the drawings. However, it is noted the technical scope of the invention is not limited to the embodiments described below, and instead covers the invention described in the claims and the equivalents thereof.

FIG. 1 shows an exemplary configuration of a multithreading processor according to an embodiment of the present invention. A multithreading processor 1 has context units, of which number is equal to the number of threads to be executed simultaneously, to preserve the contexts of each thread. In the example shown in FIG. 1, four context units 10-13 are provided. Each context unit includes a register 14 for storing an arithmetic operation result, a program counter 15 for storing an address from which an instruction is read out next, and an instruction buffer 16 for storing the instruction read out.

An instruction execution flow in the multithreading processor is as shown below. First, a fetch unit 17 searches a cache memory 22 so as to fetch the instruction of the address specified by program counter 15 of each thread. The instruction of the specified address is stored into instruction buffer 16 after being read out either from a main memory 2 when the specified address is not found in cache memory 22 (i.e. 'missing cache'), or from cache memory 22 when the specified address is found in cache memory 22. A decode unit 19 decodes the instruction stored in instruction buffer 16, and an instruction execution unit 20 executes the decoded instruction.

Also, multithreading processor 1 has the counters shown below, to decide an operation state thereof. There is a case that an instruction fetch fails because of some reason (for example, occurrence of missing cache) at the time of fetching, and decode processing cannot be performed (which is termed 'fetch stall'). Fetch unit 17 has a fetch stall counter 18 on a thread-by-thread basis, for recording the number of fetch stall times.

Instruction execution unit 20 has an IPC (instruction per cycle) counter 21, in which the number of instructions having been executed per cycle is recorded on a thread-by-thread basis. One cycle is a reciprocal number of an internal frequency of the multithreading processor and that is a unit time). Cache memory 22 has a missing cache counter 23, in which the number of missing cache times is recorded on a thread-by-thread basis, and a memory access latency counter 24, in which the time duration from accessing the main memory to the time an instruction or a data is read out is recorded when the instruction or data is not found in the cache (i.e. missing cache).

Figure 2C:
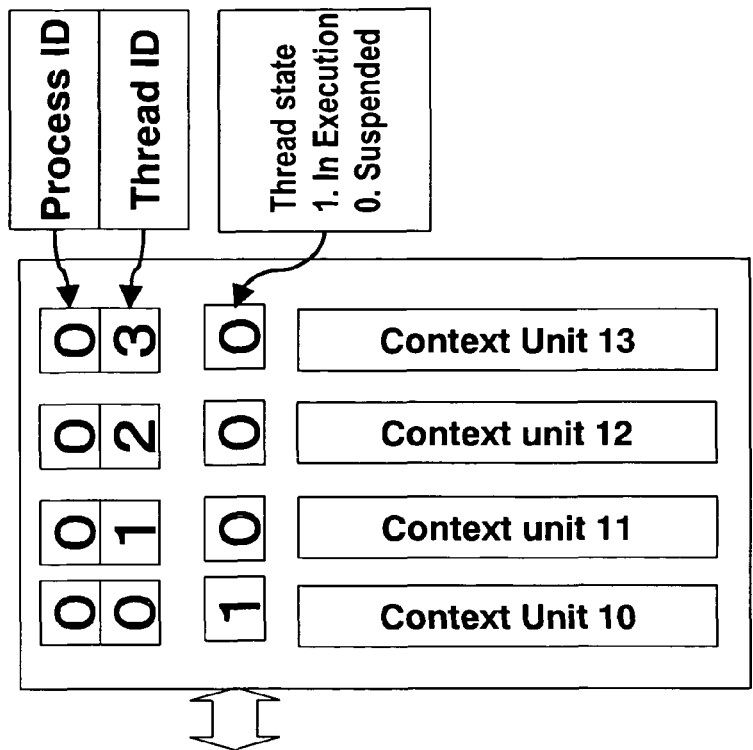
FIG. 2 shows an explanation diagram illustrating a first embodiment.

FIG. 2 shows an explanation diagram illustrating a first embodiment. The first embodiment shows an example in which an operation state of the multithreading processor is decided from the number of fetch stall times in the threads simultaneously executed, and the number of threads executed simultaneously is changed according to the operation state, thereby avoiding delay caused by resource competition. A reference value of the fetch stall times is assumed to be set in advance.

Figure 2B:
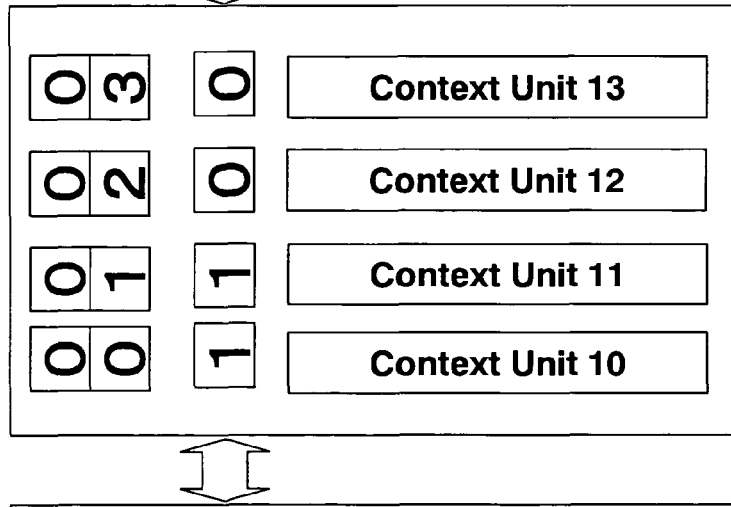
Figure 2A:
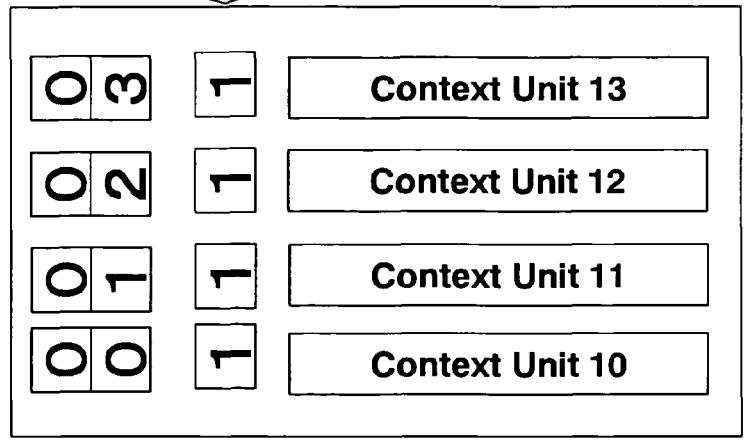

In FIG. 2, context units, thread IDs assigned to the context units, process IDs of the threads, and execution state of the threads are illustrated. FIG. 2a illustrates a state in which four threads (thread IDs 0-3) of process ID 0 are assigned to context units 10-13, and the four threads are in execution.

Figure 3:
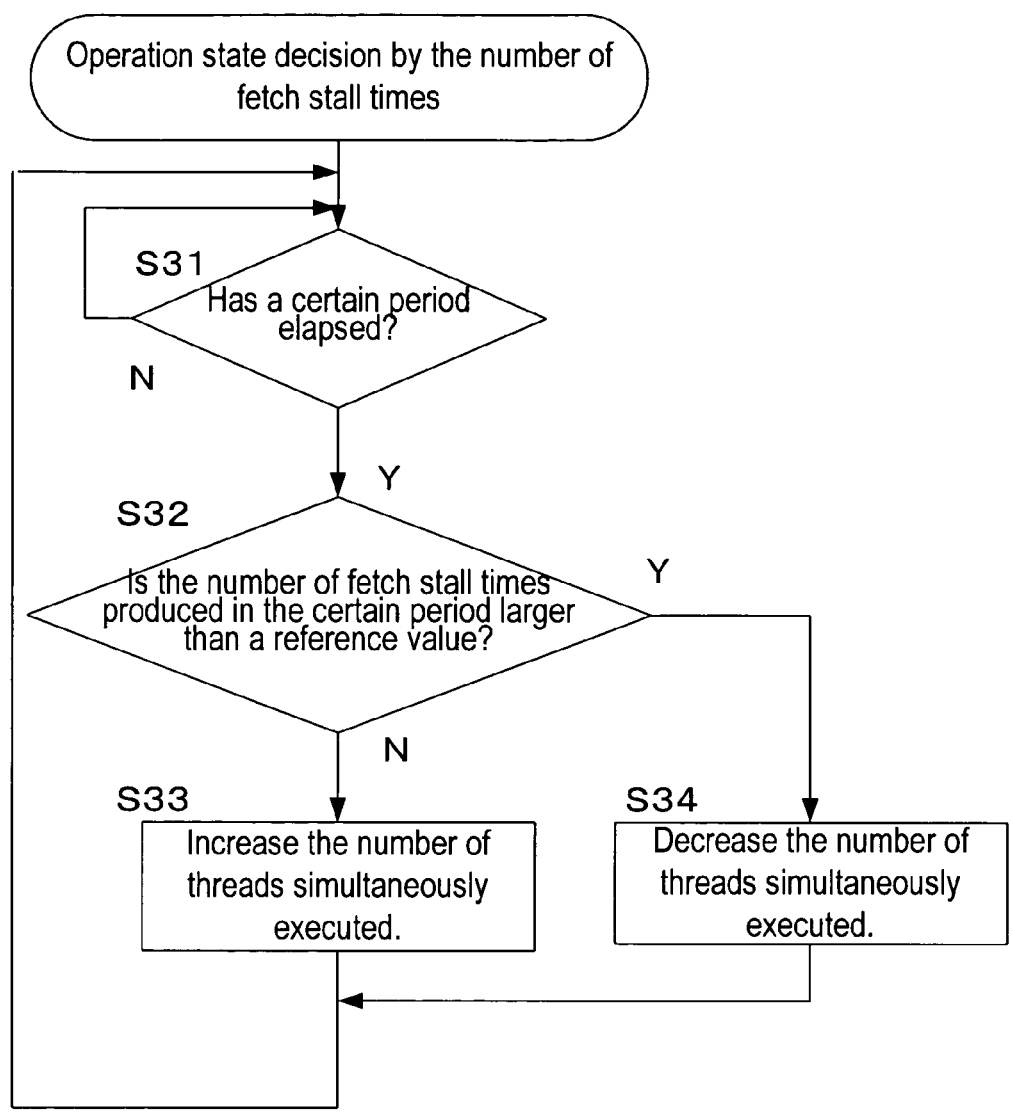
FIG. 3 shows a flowchart illustrating an operation state decision by the number of fetch stall times.

As a result of the operation state decision shown in FIG. 3 by means of the number of fetch stall times, if the number of fetch stall times in a predetermined period is greater than a fetch stall reference value, then the state is shifted from a state that four threads have been in simultaneous execution, as shown in FIG. 2a, to a state that two threads are in simultaneous execution, as shown in FIG. 2b. By deciding the new operation state, if the number of fetch stall times is greater than the fetch stall reference value, then the two-thread execution state shown in FIG. 2b is shifted to a one-thread execution state shown in FIG. 2c. If the number of fetch stall times is no greater than the fetch stall reference value, then the two-thread execution state shown in FIG. 2b is shifted to the four-thread simultaneous execution state shown in FIG. 2a. In such a way, state transitions occur between FIG. 2a and FIG. 2b, and between FIG. 2b and FIG. 2c.

FIG. 3 shows a flowchart illustrating an operation state decision by the number of fetch stall times. First, it is decided whether a predetermined period has elapsed (S31). If the predetermined period has not elapsed, step S31 is repeated till the predetermined period elapses. If the predetermined period has elapsed, it is decided whether the number of fetch stall times in the period concerned is greater than a set fetch stall reference value (S32). The decision of step S32 may possibly be performed, for example, by comparing the sum of the fetch stall times having occurred in the predetermined period in the threads assigned to the context units with the fetch stall reference value.

In step S32, in case the number of fetch stall times is greater than the fetch stall reference value, the number of threads to be executed simultaneously is decreased (S34). The reason is that resource competition, which degrades processing efficiency, is supposed to occur as a result of a multiplicity of threads being in execution. Therefore, by decreasing the number of threads, the resource competition is to be avoided.

On the contrary, in step S32, if the number of fetch stall times is no greater than the fetch stall reference value, the number of threads to be executed simultaneously is increased (S33). The reason is, because a context unit(s) not in use is existent, and no resource competition has occur in the thread (s) presently in execution, it is considered that room is left for improving the processing efficiency. On completion of steps S33, S34, the processing from step S31 is repeated till the predetermined period elapses again.

According to the first embodiment, an operation state of the multithreading processor is decided from the number of fetch stall times, and the number of threads to be executed simultaneously is changed to fit the operation state. Thus, it becomes possible to avoid delay caused by the resource competition, and improve the processing performance. Here, in the first embodiment, the operation state is decided by use of the number of fetch stall times. However, it may also be possible to decide the operation state by memory access latency. It is assumed that a latency reference value be set in order to perform decision by use of the memory access latency.

Figure 4:
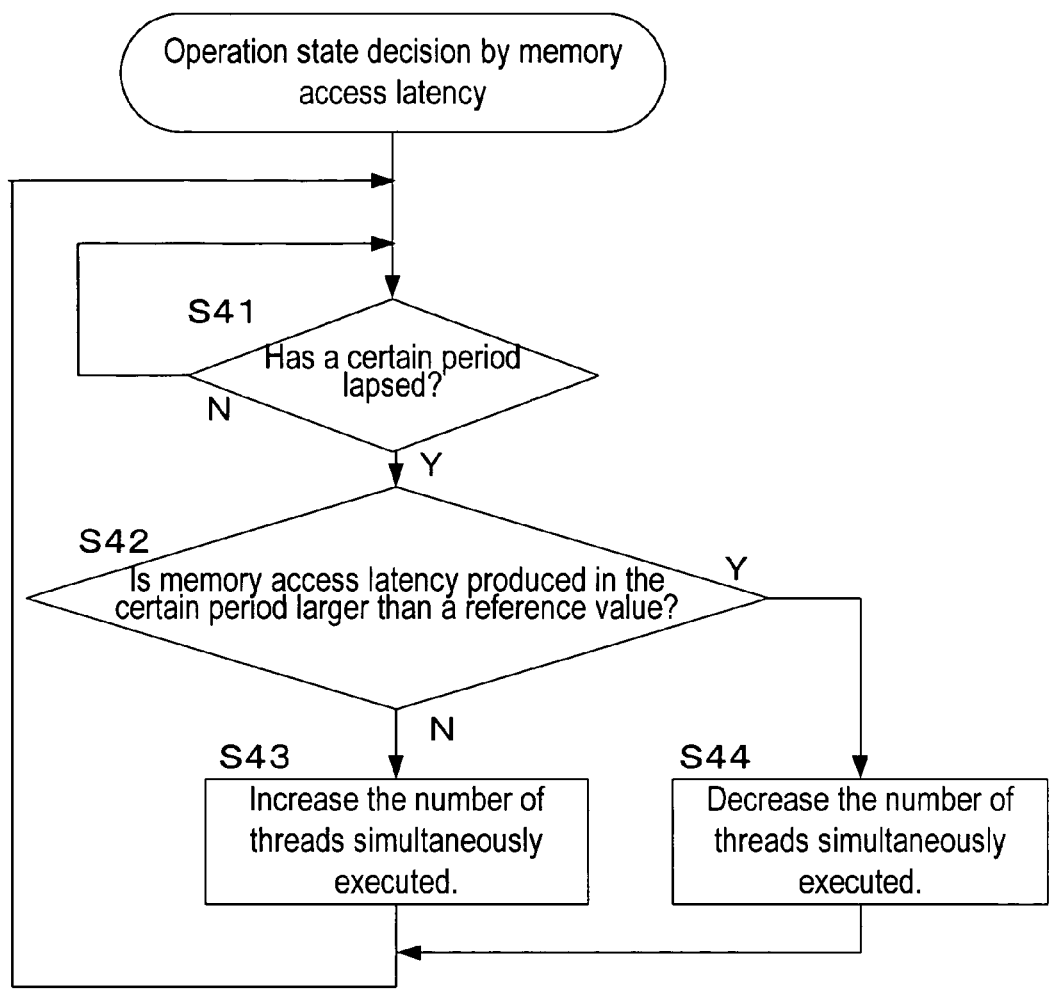
FIG. 4 shows a flowchart illustrating an operation state decision by memory access latency.

FIG. 4 shows a flowchart illustrating an operation state decision by memory access latency. First, it is decided whether the predetermined period has elapsed (S41). If the predetermined period has not elapsed, step S41 is repeated till the predetermined period elapses. If the predetermined period has elapsed, it is decided whether the memory access latency in the period concerned is greater than a set latency reference value (S42).

In step S42, in case the memory access latency is greater than the latency reference value, the number of threads to be executed simultaneously is decreased (S44). The reason is that resource competition, which degrades processing efficiency, is supposed to occur as a result of a multiplicity of threads being in execution. Therefore, by decreasing the number of threads, the resource competition is to be avoided.

On the contrary, in step S42, if the memory access latency is no greater than the reference value, the number of threads to be executed simultaneously is increased (S43). The reason is, because a context unit(s) not in use is existent, and no resource competition has occur in the thread(s) presently in execution, it is considered that room is left for improving the processing efficiency. On completion of steps S43, S44, the processing from step S41 is repeated till the predetermined period elapses again.

In a similar way, it is also possible to decide the operation state of the multithreading processor using the missing cache counter. Further, it is also possible to decide the operation state of the multithreading processor using the IPC counter. In this case, the number of threads is increased when the measured IPC value is greater than the reference value set for the IPC, while the number of threads is decreased when the measured IPC value is smaller, which is different from the method shown in FIG. 3 or FIG. 4.

Figure 5:
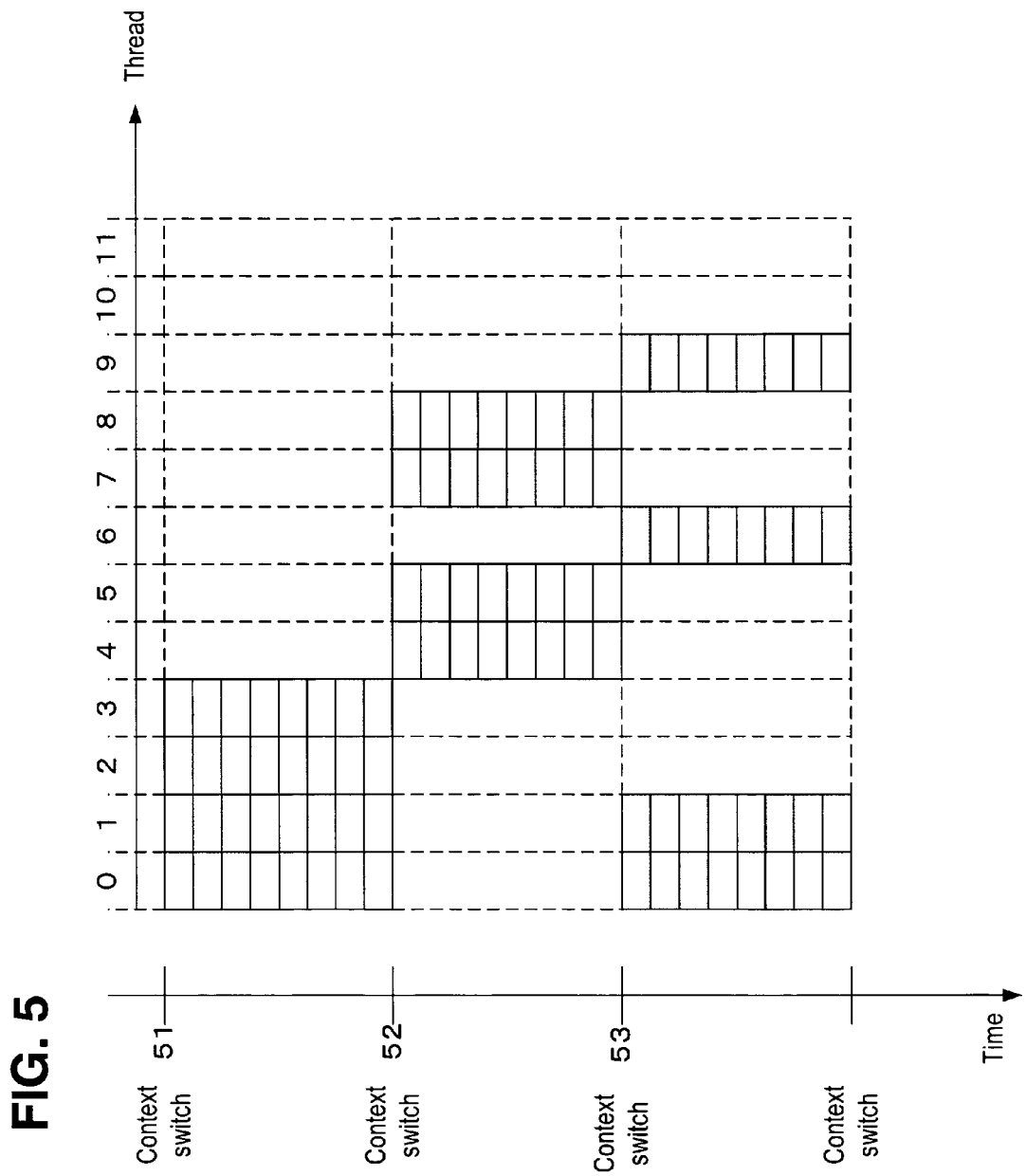
FIG. 5 shows an explanation diagram illustrating a second embodiment.

FIG. 5 shows an explanation diagram illustrating a second embodiment. The second embodiment shows an example in which the threads to be executed simultaneously is dynamically selected by combining a thread(s) having a relatively large number of fetch stall times with a thread(s) having a relatively small number of fetch stall times, thereby avoiding delay caused by resource competition. Here, at the timing other than the context switching, the method of the first embodiment is applied.

In FIG. 5, the vertical axis represents a lapse of time, and the horizontal axis represents threads to be executed. The solid line shows the thread concerned is allotted to each context unit, and the colored part shows the thread concerned is being executed.

Context switch 51 shown in FIG. 5 represents a state that twelve threads, threads 0-11, are existent as threads to be executed, and that four threads, threads 0-3, are allotted to four context units. In the state of context switch 51, the entire threads 0-3 are initially placed in the execution state. In FIG. 5, the first embodiment is applied, and the number of threads executed simultaneously is dynamically changed through the period from context switch 51 to context switch 52.

At the timing of context switch 52, as a result that the highest two threads in terms of the rank of the number of fetch stall times and also the lowest two threads are selected (refer to FIG. 6), threads 4, 5, 7, 8 are allotted to the context units. Further, as a result of applying the first embodiment, in context switch 52, thread 4 is executed first. Thereafter, by applying the first embodiment, the number of threads is dynamically changed.

Figure 6:
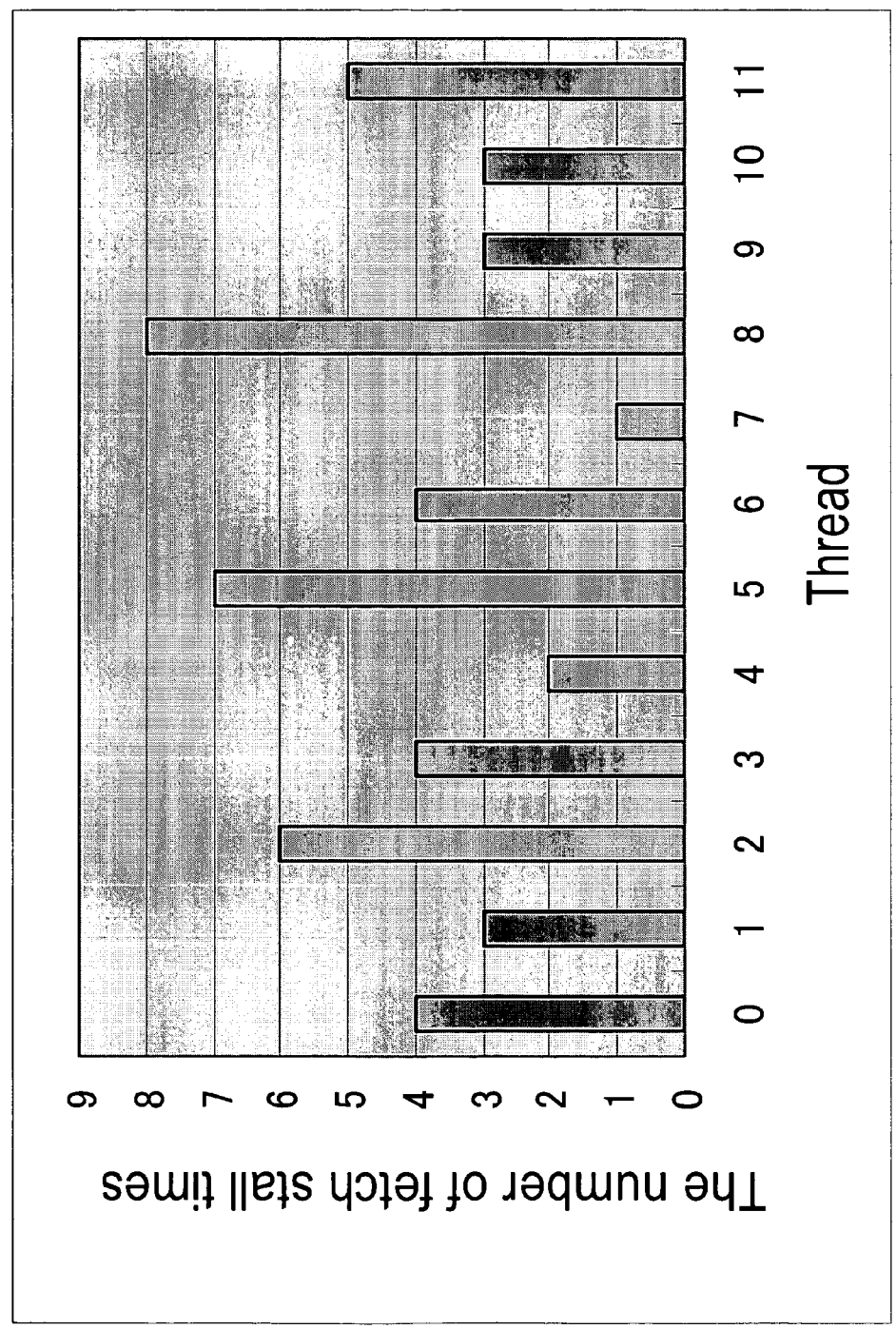
FIG. 6 shows an example of the number of fetch stall times corresponding to each thread.

FIG. 6 shows an example of the number of fetch stall times corresponding to each thread at the timing of context switch 52. In the second embodiment, the number of fetch stall times is accumulatively recorded on a thread-by-thread basis. As the highest two threads, threads 5, 8 are selected, while as the lowest two threads, threads 4, 7 are selected.

In a similar way, at the timing of context switch 53, as a result that the highest two threads and the lowest two threads in terms of the number of fetch stall times are selected, threads 2, 3, 7, 10 are allotted to the context units. In addition, as a result of applying the first embodiment, first, four threads 2, 3, 7, 10 are executed, and thereafter by applying the first embodiment also, the number of threads is dynamically changed.

According to the second embodiment, by selecting the highest two threads and the lowest two threads in terms of the number of fetch stall times, delay caused by resource competition can be avoided, and thus the processing efficiency of the multithreading processor can be improved. Preferably, by dynamically selecting the threads to be executed simultaneously, with the combination of the first embodiment, further performance improvement can be obtained.

Additionally, as thread selection method, it may also be possible to select either the highest thread and the lowest three threads, or the highest three threads and the lowest thread. Although there are a multiple number of combinations of the higher-rank threads with the lower-rank threads in case the number of installed context units is other than four, the second embodiment is applicable by explicitly selecting threads from the highest and threads from the lowest.

Figure 7:
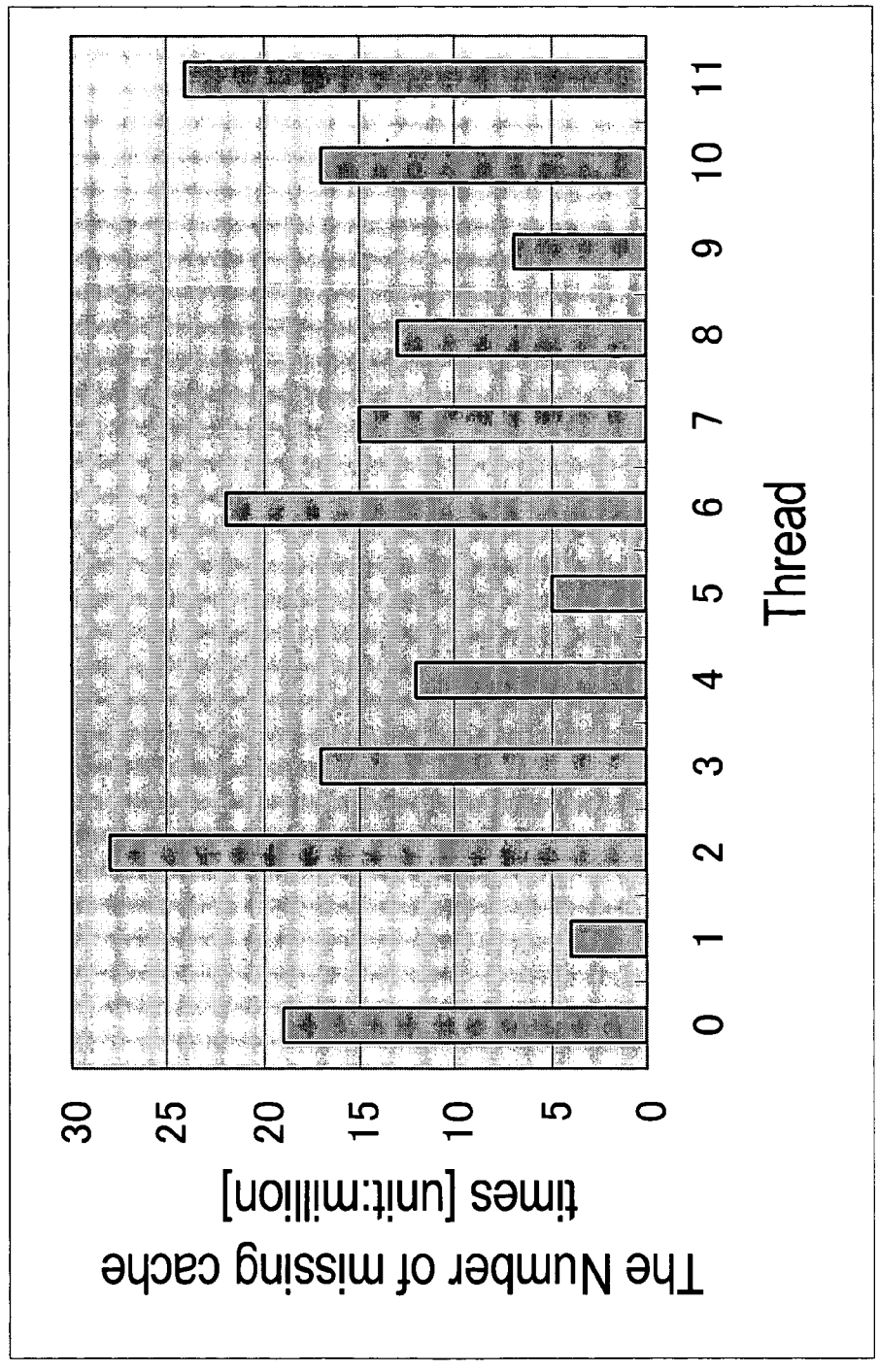
FIG. 7 shows an example of the number of missing cache times corresponding to each thread.

Also, although the threads are selected by the number of fetch stall times in the second embodiment, it is possible to select by the number of missing cache times. FIG. 7 shows an example of the number of missing cache times corresponding to each thread. In the example shown in FIG. 7, for example, when the highest two threads and the lowest two threads in terms of the number of missing cache times are to be selected, threads 1, 2, 5, 11 are selected.

Figure 8:
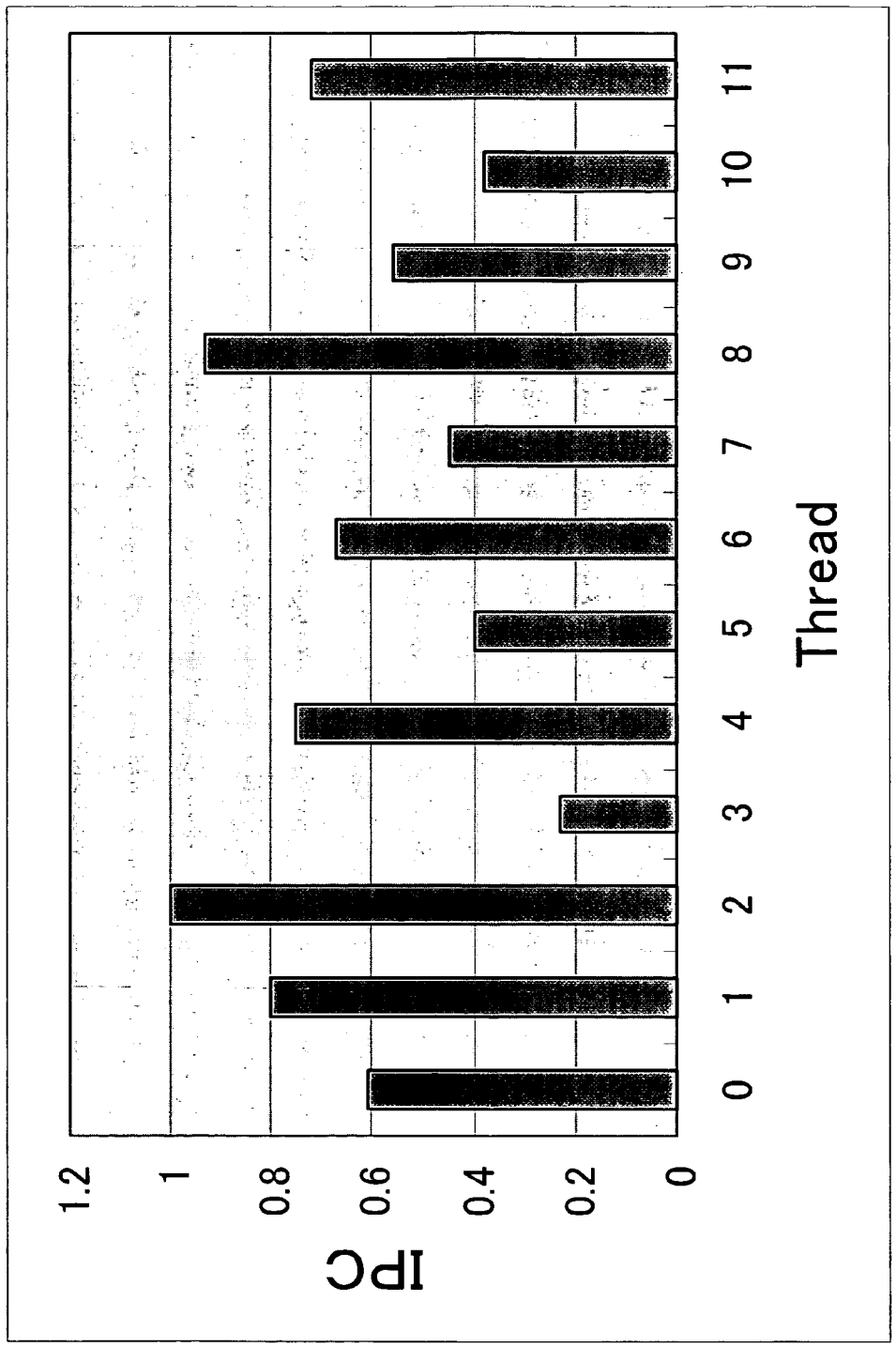
FIG. 8 shows an example of an IPC (instruction per cycle) value corresponding to each thread.

Similarly, it is possible to perform thread selection by use of IPC values. FIG. 8 shows an example of the IPC value corresponding to each thread. In the example shown in FIG. 8, for example, when the highest two threads and the lowest two threads of the IPC values are to be selected, threads 2, 3, 8, 10 are selected.

FIG. 9 shows an explanation diagram illustrating a third embodiment. The third embodiment shows an example in which the threads in the identical process are selected with priority as execution thread at the time of fetching or context switching, thereby avoiding delay caused by resource competition. Because the threads in the identical process are operated with an identical shared memory space, an increase of missing cache times (cache competition) becomes smaller than a case of selecting the threads of different processes operated in different memory spaces. Accordingly, it becomes possible to avoid delay caused by accessing the main memory which is lower in speed than the cache memory.

Figure 9B:
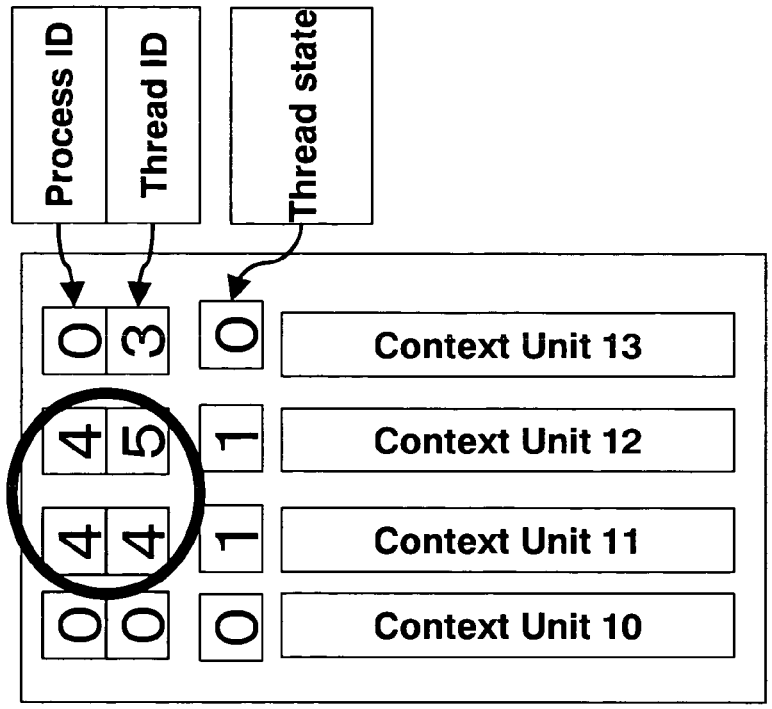
FIG. 9 shows an explanation diagram illustrating a third embodiment.
Figure 9A:
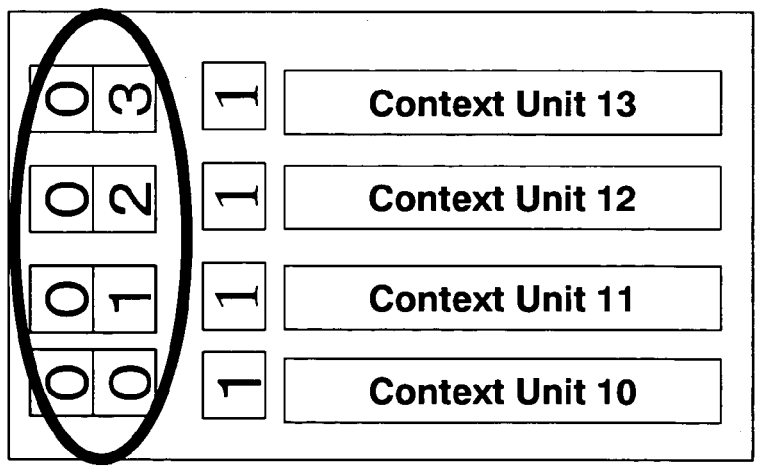

FIG. 9a shows a state such that four threads (threads 0-3) from process 0 are allotted with priority to the context units, and that the entire four threads are executed. FIG. 9b shows a state such that two threads (threads 4, 5) in process 4 are executed, among thread 0, 3 in process 0 and threads 4, 5 in process 4 respectively allotted to the contexts.

According to the third embodiment, threads in an identical process operated with an identical shared memory space are selected with priority, instead of threads of different processes operated in different memory spaces. Therefore, no undesirable influence is produced among the plurality of threads. Thus, delay caused by resource competition can be avoided, resulting in an improved processing efficiency of the multithreading processor. Preferably, it is recommended to implement using the combination of the first embodiment with the second embodiment, so as to select the threads producing a better processing efficiency.

FIG. 10 shows an explanation diagram illustrating a fourth embodiment. The fourth embodiment shows an example in which threads are executed in divided phases: a sampling phase measuring an operation state by changing the conditions; and an execution phase selecting the threads to be executed, based on a condition such that the processing efficiency becomes the highest in the operation state measured in the sampling phase. Thus, delay caused by resource competition is avoided.

First, in a sampling phase 102, for example, four threads (threads 0-3) shown in FIG. 2a are executed. Next, as the two threads shown in FIG. 2b, two kinds, i.e. threads 0, 1 and threads 2, 3, are executed. Subsequently, as the one thread shown in FIG. 2c, four kinds, i.e. thread 0, thread 1, thread 2 and thread 3 are executed. Additionally, as the combinations of the threads executed in the sampling phase, other combinations than those described above are existent. For example, it is possible to add a pair of threads 0, 2 at the time of executing two threads.

In such a way, statistic information is collected for each thread, and the optimal number of threads is decided. As such statistic information for selecting the optimal threads, for example, the number of fetch stall times per thread may be used. In an execution phase 103, the threads of optimal combination decided in sampling phase 102 are executed.

According to the fourth embodiment, the optimal combination is decided after the operation state related to a variety of combinations is actually measured. Thus, delay caused by resource competition can be avoided, resulting in an improved processing efficiency of the multithreading processor.

Additionally, although the number of fetch stall times is used for deciding the operation state in the fourth embodiment, it is also possible to use IPC value, number of missing cache times, memory access latency, etc. Further, as a method for deciding the optimal combination, it is also possible to apply a method of selecting, with attention directed to a certain thread, based on a condition that the processing efficiency of the thread of interest becomes the highest.

Moreover, it is possible to actualize the methods applied in the embodiments of the present invention as the function of each unit. By way of example, it is possible to implement the decision shown in FIG. 3 in fetch unit 17.

INDUSTRIAL APPLICABILITY

As having been described, according to the present invention, the number of threads to be executed simultaneously, or the combination of the threads, is dynamically selected by measuring an operation state of a multithreading processor, and the execution is scheduled so as to avoid delay caused by resource competition, thereby enabling an improved processing efficiency of the multithreading processor.

What is claimed is:

1. A scheduling method in a multithreading processor including a plurality of context units, each of which comprises a program counter and an instruction buffer, the scheduling method comprising:
    allotting a plurality of executable threads respectively to a plurality of context;
    setting a fetch stall reference value, which is a threshold for the number of times of fetch stalls;
    fetching by a fetch unit, a next instruction from a cache memory at an address specified by the program counter, and storing the fetched next instruction in the instruction buffer for each of the plurality of context units;
    decoding by a decoding unit, next instructions stored in the instruction buffers of the plurality of context units;
    executing by an instruction execution unit, the decoded next instructions of the plurality of context units;
    recording in a fetch stall counter, the number of times of fetch stalls in a given period during the decoding by the decoding unit; and
    dynamically deciding the number of threads paired together for simultaneous execution according to the number of times of fetch stalls recorded in the fetch stall counter, so as to decrease the number of context units in execution within the plurality of context units corresponding to the decided number of threads when the recorded number of times of fetch stalls exceeds the fetch stall reference value, and to increase the number of context units in execution within the plurality of context units corresponding to the decided number of threads when the recorded number of times of fetch stalls does not exceed the fetch stall reference value.

2. The scheduling method according to claim 1, wherein the selection of the decided number of threads is performed by combining a thread having a large number of times of stalls and a thread having a small number of times stalls.

3. A scheduling method in a multithreading processor comprising:
  allotting a plurality of executable threads respectively to a plurality of context units, which respectively include a program counter and an instruction buffer;
  setting a latency reference value, which is a threshold length for latencies in accessing the cache memory;
  fetching by a fetch unit, a next instruction from a cache memory at an address specified by the program counter, and storing the fetched next instruction in the instruction buffer for each of the plurality of context units;
  decoding by a decoding unit, next instructions stored in the instruction buffers of the plurality of context units;
  executing by an instruction execution unit, the decoded next instructions of the plurality of context units;
  recording in a memory access latency counter, the length of latencies when accessing the cache memory in a given period during the decoding by the decoding unit; and
  dynamically deciding the number of threads paired together for simultaneous execution according to the length of latencies recorded in the memory access latency counter, so as to decrease the number of context units in execution within the plurality of context units corresponding to the decided number of threads when the recorded length of latencies exceeds the latency reference value, and to increase the number of context units in execution within the plurality of context units corresponding to the decided number of threads when the recorded length of latencies does not exceed the latency reference value.

4. A multithreading processor comprising:
  a plurality of context units, each corresponding to a single thread and including a program counter and an instruction buffer;
  a fetch unit to fetch a next instruction from a cache memory at an address specified by the program counter;
  a storing unit to store the fetched next instruction in the instruction buffer for each of the plurality of context units;
  a decode unit to decode the next instructions stored in the instruction buffers of the plurality of context units; an instruction execution unit to execute the decoded next instructions of the plurality of context units; and
  a fetch stall counter to record the number of times of fetch stalls in a given period during the decoding by the decoding unit,
  wherein the multithreading processor dynamically decides the number of threads to be executed according to the number of times of fetch stalls counted by the fetch stall counter so as to decrease the number of context units in execution within the plurality of context units corresponding to the decided the number of threads when the counted number of times of fetch stalls exceeds a given fetch stall reference value, and to increase the number of context units in execution within the plurality of context units corresponding to the decided the number of threads when the counted number of times of fetch stalls does not exceed the fetch stall reference value.

5. The multithreading processor according to claim 4, wherein the multithreading processor selects the decided number of threads to be executed .by combining a thread having a large number of times of fetch stalls and a thread having a small number of times of fetch stalls.

6. The multithreading processor according to claim 4, further comprising:
  a missing cache counter recording the number of times of missing caches in a given period,
  wherein the multithreading processor selects the decided number of threads to be executed .by combining a thread having a large number of times of missing caches with a thread having a small number of times of missing caches.

7. The multithreading processor according to claim 4, further comprising:
  an IPC counter recording the number of instructions executable per cycle in a given period,
  wherein the multithreading processor selects by combining a thread having a large number of instructions executable per cycle with a thread having a small number of instructions executable per cycle.

8. A multithreading processor comprising:
  a plurality of context units, each corresponding to a single thread and including a program counter and an instruction buffer;
  a fetch unit to fetch a next instruction from a cache memory at an address specified by the program counter;
  a storing unit to store the fetched next instruction in the instruction buffer for each of the plurality of context units;
  a decode unit to decode the next instructions stored in the instruction buffers of the plurality of context units;
  an instruction execution unit to execute the decoded next instructions of the plurality of context units; and
  a memory access latency counter to record the length of latencies when accessing the cache memory in a given period during the decoding by the decoding unit,
  wherein the multithreading processor dynamically decides the number of threads paired together for simultaneous execution according to the length of latencies recorded by the memory access latency counter so as to decrease the number of context units in execution within the plurality of context units corresponding to the decided the number of threads when the recorded length of latencies exceeds a latency reference value, and to increase the number of context units in execution within the plurality of context units corresponding to the decided the number of threads when the recorded length of latencies does not exceed the latency reference value.

* * * * *

UNITED STATES PATENT AND TRADEMARK OFFICE
CERTIFICATE OF CORRECTION

| | | |
|---|---|---|
| PATENT NO. | : 7,954,102 B2 | Page 1 of 1 |
| APPLICATION NO. | : 11/122047 | |
| DATED | : May 31, 2011 | |
| INVENTOR(S) | : Hideki Okawara | |

It is certified that error appears in the above-identified patent and that said Letters Patent is hereby corrected as shown below:

First Page, Column 2 (Attorney, Agent or Firm), Line 1, Delete "Stass" and insert --Staas--, therefor.

Column 8, Line 38, In Claim 1, delete "context;" and insert --context units;--, therefor.

Column 8, Line 67, In Claim 2, delete "times" and insert --times of--, therefor.

Signed and Sealed this
Ninth Day of August, 2011

David J. Kappos
*Director of the United States Patent and Trademark Office*